United States Patent
Bausch, deceased

[11] Patent Number: 5,261,500
[45] Date of Patent: Nov. 16, 1993

[54] FOUR-WHEEL STEERING LOCKING MECHANISM FOR A MOTOR VEHICLE

[75] Inventor: Paul Bausch, deceased, late of Eltville, Fed. Rep. of Germany, by Wiltrud Karla Sofie Bausch, legal representative

[73] Assignee: General Motors Corporation, Detroit, Mich.

[21] Appl. No.: 819,707

[22] Filed: Jan. 13, 1992

[30] Foreign Application Priority Data

Jan. 18, 1991 [DE] Fed. Rep. of Germany ....... 4101369

[51] Int. Cl.⁵ .............................................. B62D 5/04
[52] U.S. Cl. .................. 180/79.1; 180/142; 180/143; 180/161
[58] Field of Search ............... 180/140, 141, 142, 143, 180/161, 79.1; 280/91

[56] References Cited

U.S. PATENT DOCUMENTS

| | | | |
|---|---|---|---|
| 4,610,328 | 9/1986 | Kanazawa et al. | 280/91 X |
| 4,793,432 | 12/1988 | Tattermusch | 280/91 X |
| 4,854,410 | 8/1989 | Kanazawa et al. | 280/91 X |
| 4,884,647 | 10/1989 | Mimuro et al. | 180/140 |
| 4,930,592 | 6/1990 | Ohmura | 280/91 X |
| 4,953,650 | 9/1990 | Ohmura | 180/140 X |
| 4,982,804 | 1/1991 | Kanazawa et al. | 180/140 |
| 5,048,633 | 9/1991 | Takehara et al. | 180/197 |
| 5,099,938 | 3/1992 | Watanabe et al. | 180/140 |
| 5,147,004 | 9/1992 | Weisgerber et al. | 280/91 X |

FOREIGN PATENT DOCUMENTS

| | | |
|---|---|---|
| 0345555 | 5/1989 | European Pat. Off. |
| 0460664 | 12/1991 | European Pat. Off. |
| 1215671 | 8/1989 | Japan |
| 3057778 | 3/1991 | Japan |

Primary Examiner—Margaret A. Focarino
Assistant Examiner—Florian Zeender
Attorney, Agent, or Firm—Mark A. Navarre

[57] ABSTRACT

Each of the control elements for steering the rear wheels of a motor vehicle is equipped with an electromagnetically operated lock. This is designed in such a way that, when current is not flowing, it limits the maximum possible sliding movement of a control rod to the amount which is necessary for steering at high driving speeds. At low driving speeds, the lock is released, so that the wheels can be turned at a greater angle to facilitate parking.

3 Claims, 4 Drawing Sheets

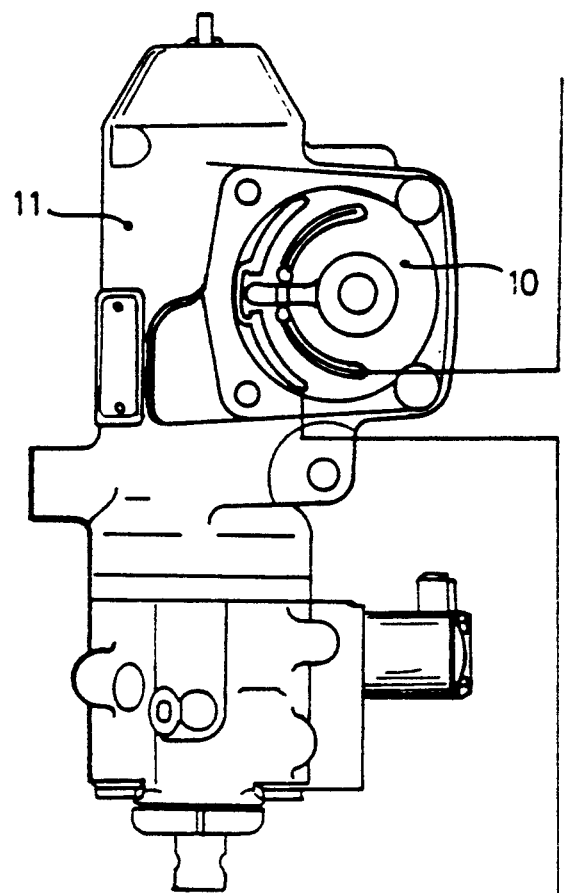
Fig.1
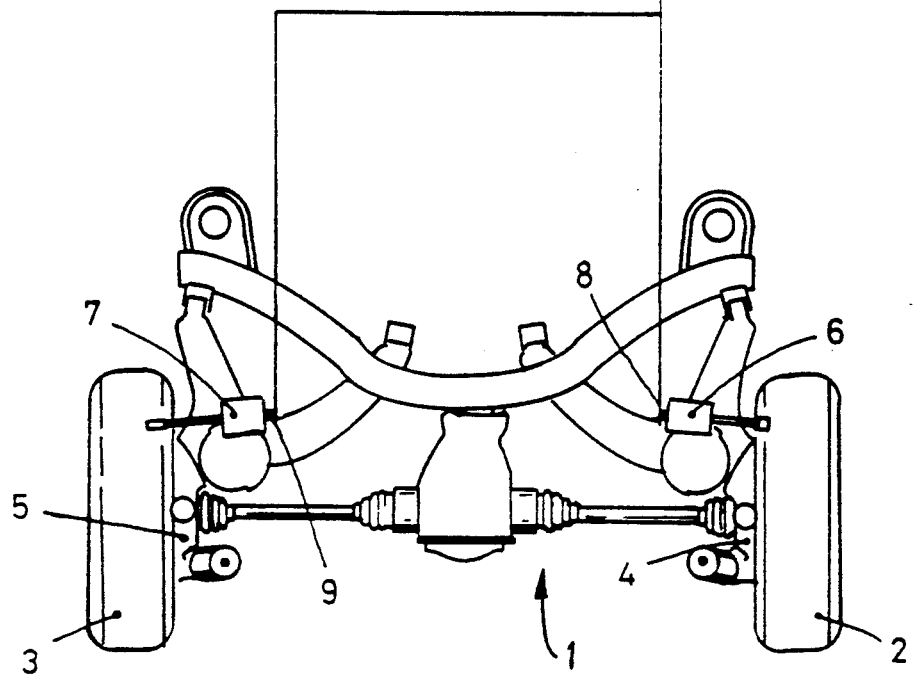

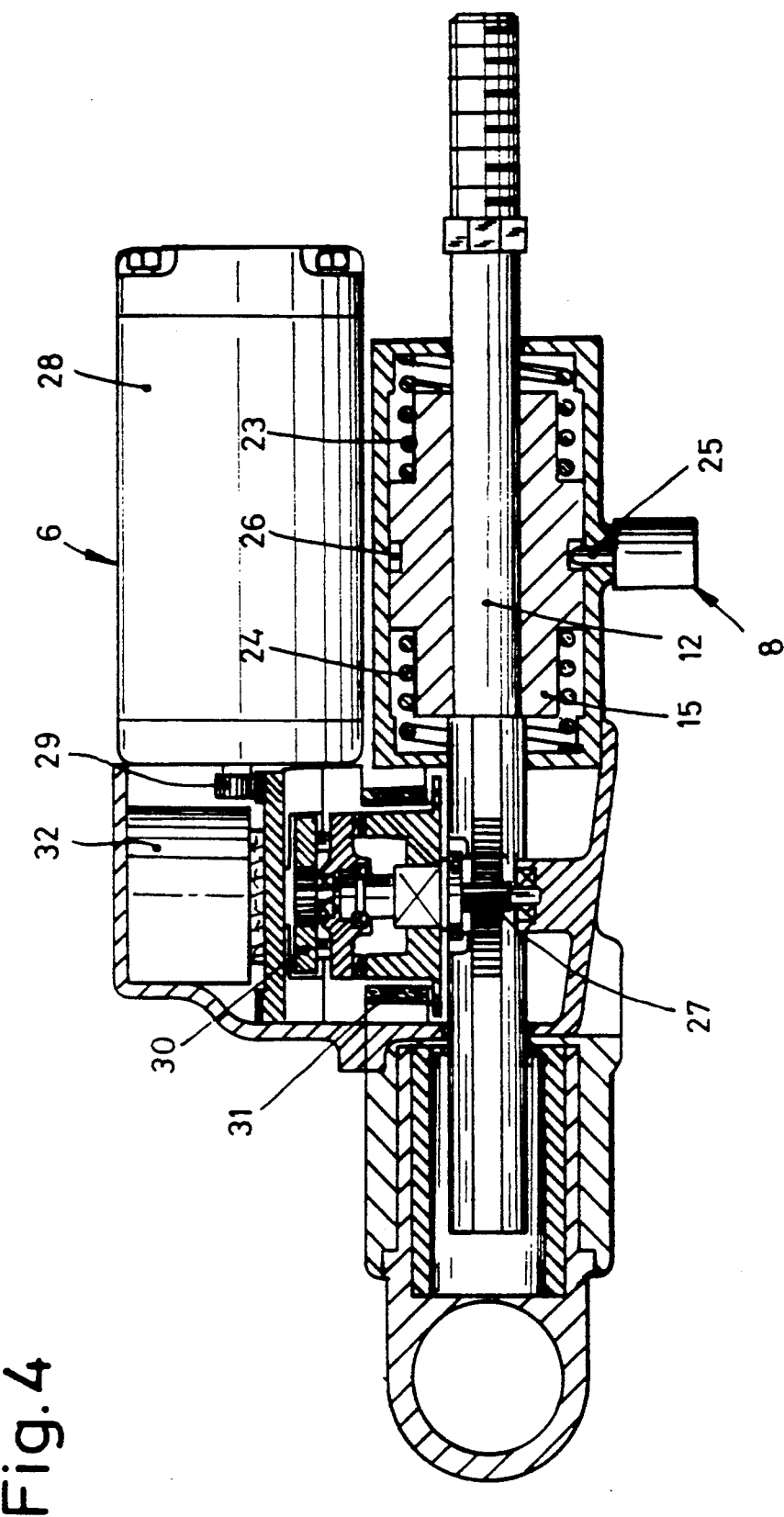

FOUR-WHEEL STEERING LOCKING MECHANISM FOR A MOTOR VEHICLE

This invention pertains to a four-wheel steering system for a motor vehicle, in which the rear wheels are designed to be steered by a steering arm controlled by control electronics and a motorized control element, and in which the control element has a lock, which is operated by a solenoid against the force of a spring, to prevent turning movements in the event of abnormal operation of the control electronics.

BACKGROUND OF THE INVENTION

In four-wheel steering systems, a turning angle of the rear wheels of approximately one degree in the same direction in which the front wheels are turning is generally sufficient for high driving speeds. However, when the vehicle is being driven into a parking space and is thus moving at low speed, the rear wheels are designed to turn more sharply to reduce the turning radius and to turn in the opposite direction from the front wheels. In this case, steering angles of up to 4 degrees may be desired. These different requirements can be satisfied by means of a turning angle position switch on the steering gear.

Since the control electronics are able to turn the rear wheels to the extent necessary for parking, it is conceivable that, due to abnormal operation of the control electronics, this sharp degree of turning could occur at high speeds and cause the vehicle to make a turn not produced by the driver. This possibility is not ruled out by previously known four-wheel steering systems, which merely ensure that if there is a loss of electrical power, the rear wheels will be locked in the straight ahead position.

SUMMARY OF THE PRESENT INVENTION

The object of the invention is to provide an improved four-wheel steering system of the type described above in which the relatively large rear-wheel turning movements used for parking cannot occur at high driving speeds, even in the event of abnormal operation of the control electronics.

In accordance with the invention, this object is achieved by providing a lock which limits the turning movement to a turning angle necessary for high driving speeds, and a solenoid which is energized at low driving speeds to release the lock.

The four-wheel steering system of the invention differs from previously known four-wheel steering systems in that the lock is in the locked position when the vehicle is being driven at high speeds. In this way, the maximum possible turning angle is limited to the narrow range established for high driving speeds. A larger turning range is possible only at low driving speeds, when the lock is in the release position as a result of the application of current. The invention thus ensures, by very simple means that undesired sharp turning of the rear wheels cannot occur at high speeds of travel.

In a constructionally simple design of the invention, the lock has a locking element which limits the movement of a piston that is rigidly connected with a control rod of the control element. The locking element is spring biased towards the piston and can be moved away from the piston by the force of the solenoid.

The locking element could be a pin, for example, which engages a piston groove which limits the maximum lifting movement of the piston. In an especially simple design of the system, two stops of the locking element are placed in the path of movement of the two end surfaces of the piston in the locked position. The length of the piston and the distance between the two stops are set in such a way that, in the locked position of the locking element, the piston can make the relatively short movements that are necessary for making turning movements at high driving speeds.

The driving behavior of a motor vehicle with the four-wheel steering system of the invention, even in the event of abnormal operation of the control electronics, is still as good as in a modern vehicle without rear-wheel steering, if the rear wheels are stressed into a toe-in position by a restoring spring. The restoring spring can be a leaf spring, a compression spring or a rubber spring mounted anywhere between the turnable axle journal and the guide rod. However, in an especially simple design of the four-wheel steering system, the restoring spring is mounted between the piston and the housing of the control element.

In another constructionally very simple design, the lock includes a locking element having a pin that can move transversely to the piston in a recess of the piston. The width of the recess exceeds the width of the pin by an amount such that the small turning movements necessary at high speeds of travel can be realized in locked positions.

In the event of abnormal operation of the control electronics, the wheels automatically turn into the safe straight-ahead position or toe-in position, when the piston is biased into a middle position by at least one compression spring. When the control element is not supplied with current, the wheels are kept in the given position in a simple way if the control element has an electric motor with an electromagnetic brake that is opened with the electric motor is being supplied with current.

In the event of abnormal operation of the control electronics, the compression springs do not have to overcome the frictional forces of the gear and the resistance of the electric motor, if, in accordance with another modification of the invention, the control element has a coupling between the electric motor and the control rod, which is opened in the event of abnormal operation of the control electronics.

In a constructionally, especially simple design of the control element, the electric motor drives a planetary gear train via an angular drive, and the electromagnetic coupling is installed between the planetary gear train and the control rod.

Numerous embodiments of the invention are possible. Two of these possible embodiments are shown in the drawings and are described below for the purpose of further illustration of the basic principle of the invention.

DESCRIPTION OF THE DRAWINGS

FIG. 1 shows a top view of a rear axle designed in accordance with the invention and a steering gear for a front axle.

FIG. 4 shows a section through a second embodiment of a control element.

DESCRIPTION OF THE EMBODIMENTS

Figure 2:
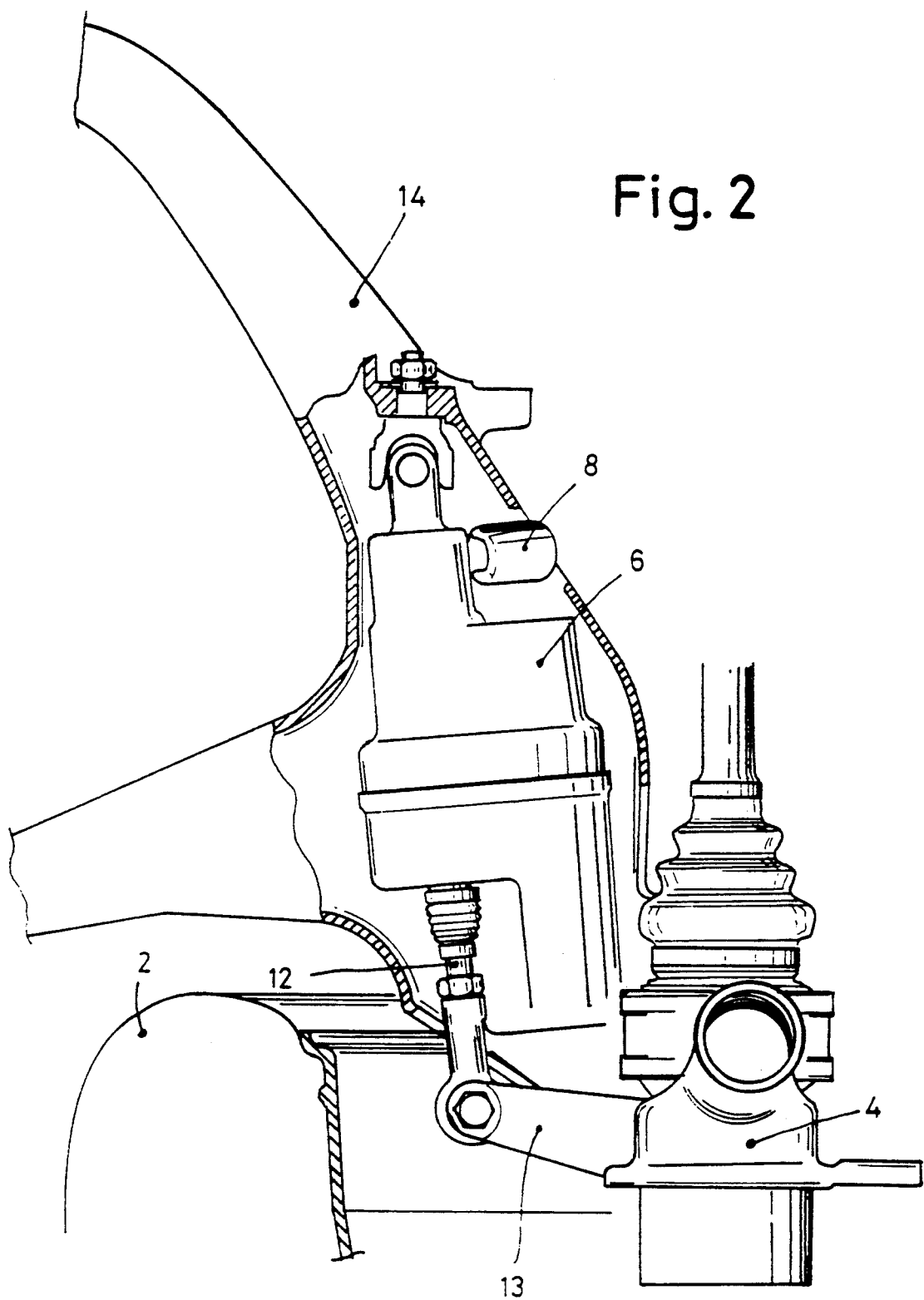
FIG. 2 shows a top view of a region of the rear axle that is relevant to the invention.

FIG. 1 shows a rear axle 1 with driven rear wheels 2, 3. The rear wheels 2, 3 are mounted on a pivoted axle journal 4, 5, so that they can be turned in one direction or the other by applying a current to a control element 6, 7. Each control element 6, 7 has an electro-magnetically operated lock 8, 9, which, when the front wheels (not shown) turn at a large angle, can be controlled by means of a turning angle position switch 10 on the steering gear 11 in such a way that it then moves into an unlocked position, in which maximum turning angles of the rear wheels 2, 3 are possible. Instead of the two control elements 6, 7, it is also possible to use a single control element to control the turning of both rear wheels via a tie rod.

FIG. 2 shows that the control element 6 has a control rod 12, which is pivoted on a steering arm 13 of the axle journal 4. The other end of the control element 6 is attached to a wheel guide element 14. The lock 8 is able to limit the possible sliding distance of the control rod 12 when it is not being supplied with current.

Figure 3:
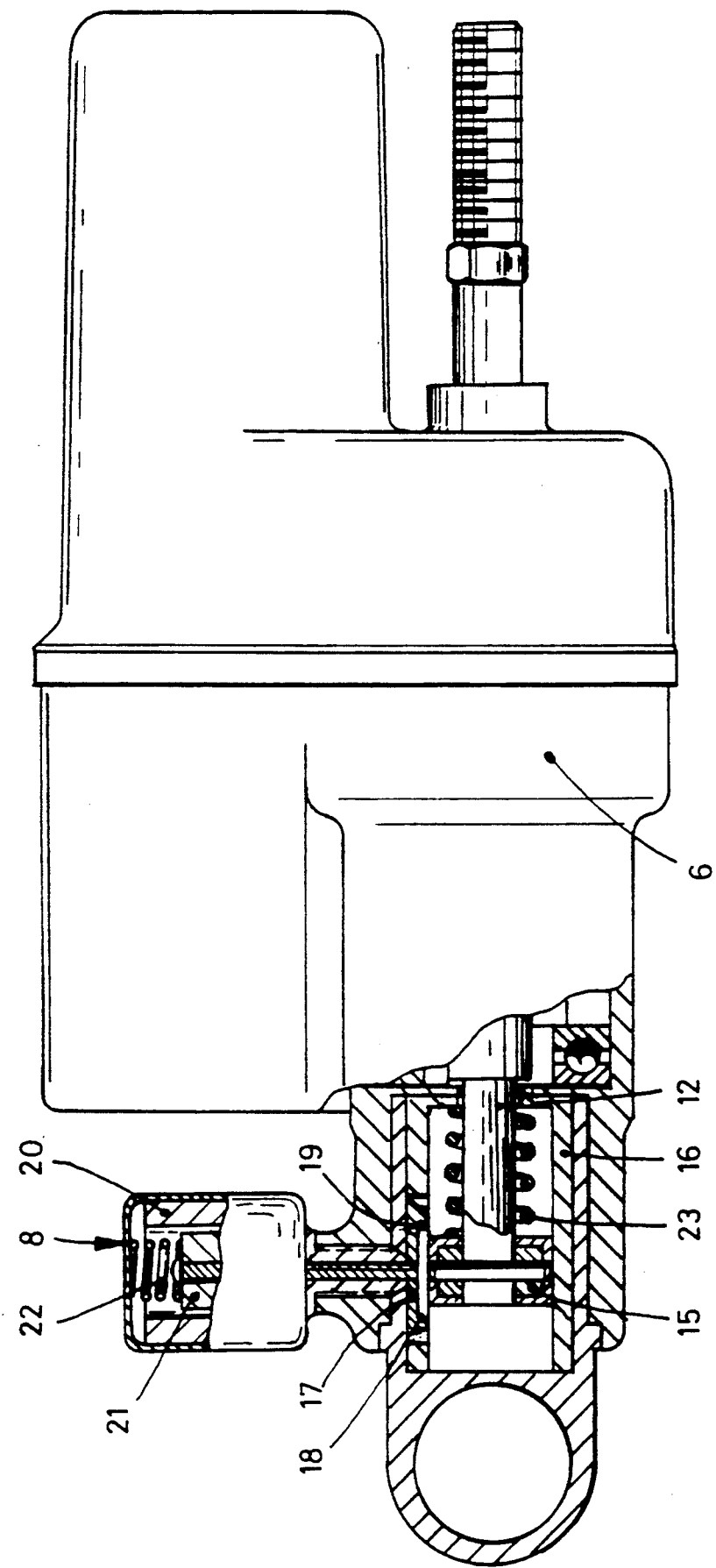
FIG. 3 shows a cutaway control element of a wheel of the rear axle shown in FIGS. 1 and 2.

The cutaway drawing in FIG. 3 shows that a piston 15 is mounted on the control rod 12 in a cylindrical housing 16. The lock 8 has a locking element 17, which is shown here in the retracted position, and which as a stop 18, 19 on either side of the piston 15. This retracted position is reached when, as a result of a command from the turning angle position switch 10 (FIG. 1), a coil 20 of the lock 8 is supplied with current, which causes an armature 21 to be drawn upward (as shown in the drawing) against the force of a spring 22. If the coil 20 is not supplied with current, the spring 22 pushes the armature 21 down. This causes the locking element 17 to move towards the piston 15, so that its two stops 18, 19 limit the maximum possible stroke distance of the piston 15.

If the coil 20 is supplied with current, then the locking element is in the retracted position shown in the drawing. Therefore, the piston 15 is able to move beyond the stops 18, 19. If a power loss occurs in the control element 6 and in the lock 8, then a restoring spring 23 is able to move the piston 15 and thus the control rod 12 to the left (as shown in the drawing) until the piston 15 rests against the stop 18, and the rear wheel 2 is turned into the toe-in position. Slopes on the two outer edges of the locking element 17 allow the piston 15 to push the locking element 17 up at first, so that it can move between the stops 18, 19.

In the embodiment of the invention shown in FIG. 4, the piston 15 of the control rod 12 is held in a middle position by two restoring springs 23, 24. The lock 8 has a pin 25 which acts as the locking element by entering a recess 26 of the piston 15 formed by a circumferential groove. The width of the recess 26 exceeds the width of the pin 25 by an amount such that, when the lock 8 is not being supplied with current, i.e., when the lock 8 is in the locked position, turning movements of about one degree in both directions are possible. Therefore, at high speeds, when the lock 8 is engaged, only the small turning movements of the rear wheels that are required at high speeds can be performed and not the large turning movements that are needed during parking.

In the embodiment of the invention shown in FIG. 4, the control rod 12 is designed as a rack engaged by a pinion 27. The pinion 27 is driven by an electric motor 28 via an angular drive 29 and a planetary gear train 30. An electromagnetic coupling 31 breaks the connection of the pinion 27 with the planetary gear train 30 when no current is being supplied. When the electric motor 28 is not being supplied with current, an electromagnetic brake 32 blocks the control element 6, so that no turning movements can be made.

What is claim is:

1. A four-wheel steering system for a motor vehicle, in which the rear wheels are designed to be steered by a steering arm controlled by control electronics via a motorized control element, and in which the control element has a lock which is operated by a solenoid against the force of a spring to prevent turning movements caused by abnormal operation of the control electronics, the improvement wherein:

the lock has a locking element which is shifted to a locked position at high driving speeds of the vehicle to limit movement of the piston that is rigidly connected with a control rod of the control element, the locking element having two stops thereby placed in a path of movement of two end surfaces of the piston, such stops being spaced in relation to a length dimension of the piston so that the piston is free to move in an amount necessary for producing relatively small turning angles; and the solenoid is energized to disengage the lock at low driving speeds of the vehicle, shifting the locking element to an unlocked position by virtue of said spring.

2. A four-wheel steering system for a motor vehicle, in which the rear wheels are designed to be steered by a steering arm controlled by control elementronics via a motorized control element, and in which the control element has a lock which is operated by a solenoid against the force of a spring to prevent turning movements caused by abnormal operation of the control electronics, the improvement wherein:

the lock is adapted when engaged to limit the movement of a piston that is rigidly connected with the control element;

the solecnoid is energized to disengage the lock at low driving speeds of the vehicle; and the rear wheels are biased toward a toe-in position by a restoring spring installed between the piston and a housing of the control element.

3. A four-wheel steering system for a motor vehicle, in which the rear wheels are designed to be steered by a steering arm controlled by control electronics via a motorized control element, and in which the control element has a lock which is operated by a solenoid against the force of a spring to prevent turning movements caused by abnormal operation of the control electronics, the improvement wherein:

the lock is adapted when engaged to limit the movement of a piston that is rigidly connected with the control element to limit the steering of the rear wheels to a relatively small turning angle for high driving speeds of the vehicle, the lock including a pin adapted to enter a recess of the piston, the recess having a width which exceeds that of the pin by an amount which permits movement of said piston corresponding to said relatively small turning angles; and the solenoid is energized to disengage the lock at low driving speeds of the vehicle.

* * * * *